July 3, 1956     A. BLOM-BAKKE     2,753,112
AERIAL NAVIGATION APPARATUS
Filed Jan. 14, 1952
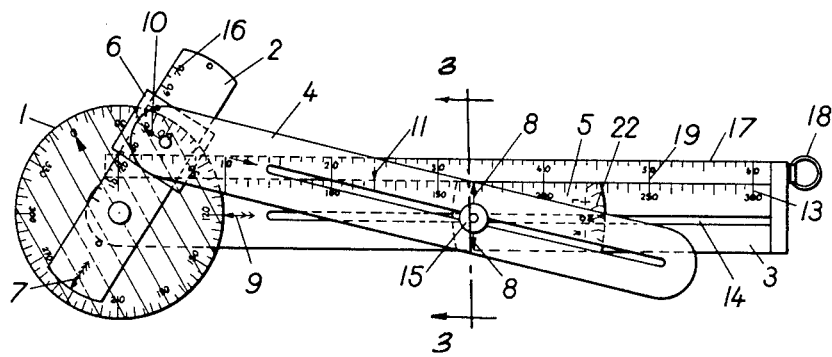
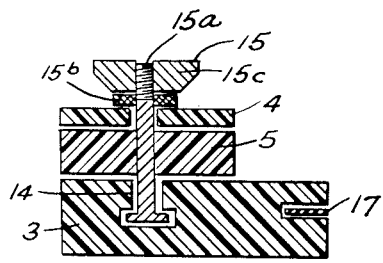
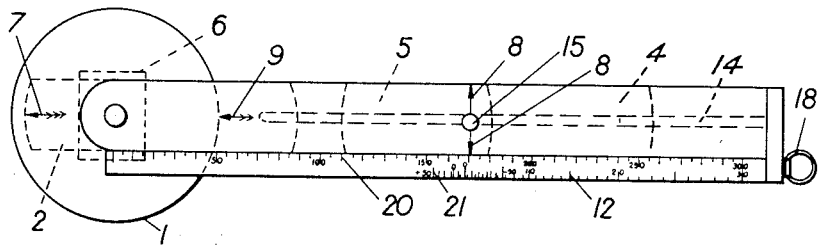
Inventor:
Arne Blom-Bakke
By
Thenderoth, Lind & Ponack
Attorneys.

United States Patent Office 2,753,112
Patented July 3, 1956

2,753,112

AERIAL NAVIGATION APPARATUS

Arne Blom-Bakke, Oslo, Norway

Application January 14, 1952, Serial No. 266,358

Claims priority, application Sweden January 19, 1951

5 Claims. (Cl. 235—61)

The present invention relates to an instrument designed for aerial navigation.

The basic object of the invention is to provide a navigation instrument by means of which aerial navigation operations take place in accordance with novel principles and by means of novel and improved methods which take care of the special conditions prevailing in air navigation.

The methods and means used today in this domain are based upon the principles of navigation on the oceans, and do not sufficiently consider the special problems and demands of aerial navigation. Said special demands may be defined as follows:

(1) Due to the enormous speeds of present day aircrafts the navigation operations must take place with extreme rapidity. The pilot or his navigator should at any time be able to determine accurately and practically instantaneously his calculated position upon the map, and he should also be able to find out what his position on the map will be at any future moment on the course his aircraft is operating upon. In other words he shall be able to determine a continuous series of accurately determined positions.

(2) The navigation methods should be so simple and safe that misdeterminations are out of question even if the determinations or calculations take place at very high rapidity and under most unfavourable conditions.

The last mentioned demand arises, inter alia, due to the fact that safety of aerial flight is extremely dependent upon good navigation (aircrafts can be kept in the air for only a limited period of time and cannot stop in the air in a case of distress). Said demand also is dependent upon the many disturbing factors prevailing when the navigation takes place and upon the great number of factors to be considered for such navigation.

(3) The ideal navigation would be one based upon a single navigation instrument or apparatus. The space conditions in an aircraft are very limited, and a pilot steering his aircraft manually will not be able to operate more than one navigation apparatus, in addition to the map necessary.

The present invention provides such an apparatus, and thus complies with the demands enumerated above.

Said demands are not stated more or less by chance, but are based upon a careful analysis of the characteristic features of flight conditions, which demands cannot be deviated from and which must absolutely be fulfilled for sufficiently safe flight under all conditions that may occur.

The methods and apparatus in use at present do not comply with said demands. As an example it may be mentioned that the present methods require the use of a plurality of different auxiliary apparatus, usually five.

For navigation the operator is in possession of a certain number of known start values, which in the following will be called basic values. The object of navigation is, by the use of such basic values, to arrive at distinct answers or results, below called navigation results. The answers aimed at depend on the task in question and are usually grouped as follows:

(1) Preparing of flight plan.
(2) Determination of positions.
(3) Wind determinations.

The apparatus of the present invention solves, alone, all said problems in a much more perfect manner than the methods hitherto in use, but in the following specification will be described in detail only preparing of a flight plan, which constitutes a primary task, since this will be sufficient for full understanding of the invention.

Said task arises when an aircraft is to be piloted from a position A to a position B on the map.

The final navigation results desired are the following:

(1) The flight course,
(2) The flight time.

The basic values and the sources from which these are derived are the following:

(1) Indicated air speed, which is read upon the speedometer of the aircraft;
(2) the altitude, read upon the altitude meter;
(3) temperature, read upon the thermometer of the aircraft;
(4) wind direction, and (5) wind speed, obtained from a meteorologic station or from own observations;
(6) ground course from A to B;
(7) distance from A to B.

The two last mentioned values are derived from the map, and differ from the other ones therein, that they are obtained in the form of physical values, as distinct from numerical values, the ground course being obtained in the form of the physical angle of meridian to the line A—B upon the map, and the distance in the form of the physical distance between A and B.

The aircraft will move from A to B at a certain speed in relation to the ground. This value, which we will call the ground speed, is a function of the true speed of the aircraft through the air and the speed of the air in relation to the ground. Together these three speeds form a vector triangle, technically termed the wind triangle. The directions or headings of these speeds may be termed the ground course of the aircraft, the flight course of the aircraft and the direction of the wind, respectively.

Neither the ground speed nor the true air speed constitute basic values, because we have no instruments upon which they are read, and since they neither represent final navigation results, they may be termed intermediate values. Thus true air speed constitutes a function of the three basic values: indicated air speed, flight altitude and temperature.

Using the methods of today the above intermediate values must be calculated and read as a certain number of unities upon an auxiliary instrument and the values thus found then be set upon other auxiliary instruments. One of the objects of the present invention is to provide a navigation apparatus making the use and reading of said two auxiliary instruments unnecessary.

For solution of the problem by means of the methods hitherto in use, it is also necessary to measure, in degrees, the physical angle between the ground course and the meridian on the map, and also to measure, in length unities, the distance between A and B upon the map. Also these two values are intermediate values which must be measured by means of auxiliary instruments, viz. protractor and dividers respectively, and which must be memorized and set upon other auxiliary instruments.

Another object of the present invention is to provide a navigation apparatus making also the reading of the last mentioned intermediate values unnecessary.

Generally it may be said, that the principal object of the present invention is to provide a navigation apparatus upon which may be set all the basic values and which gives the final navigation result without the need of reading or calculating any of the above mentioned intermediate values.

In accordance with the invention this problem is solved mainly thereby, that the apparatus is constructed as a triangle, the legs of which are adjustable in relation to each other, each triangle leg representing one of the integrating values of the wind triangle; the legs may be so adjusted and set or locked in relation to each other that upon setting of one of the vectors of the wind triangle the two other vectors thereof are simultaneously displaced in relation to each other, so that the results aimed at may be read upon scales suitably arranged in connection with the different legs of the triangle.

Thus an instrument according to the invention consists, generally, of:

(1) A triangle leg representing the course of the aircraft above the ground. Below, this triangle leg will be called the ground bar;

(2) A triangle leg representing the wind vector, and pivoted at a certain point to the ground bar. Below, this triangle leg will be called the wind bar;

(3) A triangle leg representing the speed of the aircraft through the air. The effective length of this leg is adjustable and the leg is adapted to be pivotally attached to a cursor upon the wind bar and to another cursor which is, at any time, freely displaceable and guided upon the ground bar. This last vector will below be termed the air bar.

The cursor cooperating with the wind bar is below called the wind cursor, and the cursor cooperating with the ground bar will be termed the main cursor.

In no navigation apparatus known to the present inventor the said three vectors have been adapted for intercoupling in such manner, that they could be relatively adjusted in intercoupled condition.

Further the appartus according to the invention comprises an adjustable and stretchable scale member provided with markings for indicated speed and for temperature respectively. This scale member is so arranged, that upon stretching thereof the temperature indication in question thereon may be set against a scale for altitude of flight provided on the ground bar. Hereby indicated speed is translated into true speed in the form of a physical dimension which may be fixed or locked as such upon the air bar.

Further the apparatus comprises a stretchable scale member representing time; upon stretching of this scale member the length of the units of the scale may be so altered that said scale will, for the settings made and in relation to the map used, indicate exact time as regards the motion of the aircraft above the ground. By placing the apparatus upon the map between the points of flight (A and B) one thus may, by simultaneously reading the chronometer, at any time find the location of the aircraft upon the map.

Thus the invention consists in an apparatus for aerial navigation, comprising means for manual solution of the wind triangle, and characterized, inter alia, thereby that the three vectors of the wind triangle, viz. (a) the course of an aircraft above the ground (the ground bar), (b) the wind vector (the wind bar), and (c) the speed of the aircraft through the air (the air bar) are interconnected to form an adjustable triangle, the ground bar and the wind bar being pivotally interconnected in a manner known per se, the air bar being adjustable as to its operative length and at one end thereof pivotally connected to a cursor (wind cursor) provided on the wind bar, the other end of the air bar being connected to a cursor (main cursor) provided on the ground bar, and further characterized in that in a manner known per se there is at the pivot axis of the ground bar and the wind bar pivotally mounted a graduated dial adapted for determination of the angle between the ground bar and the wind bar and for orientation of the apparatus upon a map.

Further the invention is characterized in that the wind bar is provided with a scale representing wind speed and in that the wind cursor is adapted to be set against said scale.

Still further the invention is characterized in that the air bar is provided with a longitudinally extending slot along which is slidably guided a locking member provided upon the main cursor, which locking member is adapted to be fixed to the main cursor at any desired longitudinal location.

A further feature of the invention consists therein that said locking member is provided at one end of the main cursor, the other end of said cursor being provided with a scale adapted for reading of the angle between the wind bar and the ground bar.

Another feature of the invention consists therein that the main cursor is adapted to be turned for 180° about the axis of said locking member, for adaption of the apparatus for large or small speeds.

Still another feature of the invention consists therein that the ground bar is provided with a stretchable speed scale for the indicated speed of the aircraft through the air, in connection with a temperature scale adapted to be set in relation to an elevation scale provided on the ground bar, whereby one by setting of temperature against elevation—by stretching of said stretchable scale—may find the true speed of the aircraft.

A further feature of the invention consists therein that the apparatus is provided with a stretchable time scale adapted to by stretching to be adjusted for the other special conditions, so that the time scale, when placed over a map, will indicate the point of time the aircraft is passing through any location upon said map.

Still further the invention is characterized in that the main cursor is provided with a speed index adapted to be set against said scale for indicated speed, and in that the ground bar is provided with a scale for true speed against which scale said index, or a corresponding index, will operate to indicate true speed at set elevation, temperature and indicated speed.

In order that the invention may be easily understood, it will below be described with reference to the drawing, which illustrates an embodiment of an apparatus according to the invention manufactured of transparent material.

Fig. 1 is a top plane view of the device according to the invention;

Fig. 2 is a bottom plane view of the device as shown in Fig. 1 with the wind bar and the air bar aligned with the ground bar; and Fig. 3 is a sectional view taken along the line 3—3 of Fig. 1.

The apparatus illustrated comprises a transparent graduated dial 1 provided at the periphery thereof with a usual graduation from zero to 360°, and preferably carrying moreover in the north-south-direction a number of meridian lines, for orientation of the dial in relation to a map.

At the centre of the graduated dial is pivotally attached thereto a wind bar 2 extending to opposite sides of the centre and provided at one end thereof with wind direction index 7, here shown as an arrow directed towards the graduation of the dial 1. At the centre of the dial 1 is further pivotally attached thereto a transparent ground bar 3. The arrangement is such, that the wind bar 2 and the ground bar 3, each representing a vector in the operative system of the apparatus, may be set at any desired angle in relation to each other.

A transparent air bar 4 is pivotally attached to a transparent main cursor 5 slidably guided in a suitable groove 14 extending lengthwise of the ground bar 3. On the edge of a main cursor 5 opposite the screw device 15 is a scale 22 which indicates in degrees the angle between the air bar and the ground bar. By means of a screw device 15 consisting of a threaded member 15a guided in groove 14, a fiber or like material washer 15b and a knob 15c threaded onto the threaded member 15a, said main cursor may be so locked to the air bar 4 by tightening knob 15c that the latter may swing but not slide in relation to the main cursor 5. The main cursor is always freely slidable on ground bar 3. Near the other end thereof the air bar 4 is pivotally attached to a wind cursor 6, which is slidable on the wind bar 2 in the longitudinal direction of the latter.

The main cursor 5 carries a speed index 8 visible from both sides of the apparatus and serving for setting of the main cursor 5 in relation to the speed scales, as will be fully described below.

On the ground bar 3 is provided a true track index 9, adapted to cooperate with the graduation at the circumference of the dial 1, to indicate the angular position of the ground bar 3 in relation to the dial 1.

On the wind cursor 6 is provided a wind speed index 10 adapted to cooperate with a wind speed scale 16 on the wind bar 2.

In a longitudinal slot in the ground bar 3 is inserted a stretchable band 17 of stretchable plaited rubber band secured at one end thereof to the ground bar and provided at its other end with a ring 18 by means of which the band may be stretched to extend a time scale 19 provided on one surface of the band and two scales 20, 21 respectively provided on the opposite surface of the band. The scale 20 is a scale for indicated speed and scale 21 is a scale for temperature. The time scale 17 carries a time index 11 to be used for setting of the stretchable scale in relation to the speed arrow 8 when said final position has been found.

A suitable locking device (not shown) is provided for locking the stretchable band 17 in any desired stretched position thereof.

On the front of the ground bar 3 is also provided a fixed scale 13 to indicate true air speed and ground speed. On the rear of the ground bar is an altitude scale 12.

In practice, the scales on the fronts of the graduated dial 1, the wind bar 2, the ground bar 3 and the main cursor 5 can be seen from the back of the device, but these scales are not shown in Fig. 2 in order to clarify the figure.

The apparatus elements described above provide all elements necessary for navigation of an aircraft without making intermediate readings, memorizings or setting of intermediate values.

The following describes an example of how the apparatus may be used:

Suppose that we have at hand a map, say to the scale of 1:1,000,000, and an instrument according to the invention provided with a time scale adapted for said map scale, and that the aircraft shall fly from a location A to a location B on said map.

First the wind speed index 10 is set to zero against the wind speed scale 16.

The thermometer and the altitude meter of the aircraft indicate altitude of the aircraft and the temperature of the air at that altitude. Say that said temperature is −10° C. and that the altitude is 10,000 feet. By means of the ring 18 the band 17 is stretched so that 10° on the temperature scale 21 is set against 10 (which corresponds to 10,000 feet) on the altitude scale 12.

The stretchable band 17 is locked in this position, and the main cursor 5 is then displaced until the speed index is set against that graduation of the speed scale 20 which corresponds to the indicated speed of the aircraft, say 170 knots. With the parts in this position the screw 15 is tightened, whereby the result of the manipulations hitherto is determined as a physical value, viz. as the effective length of the air bar 4 now locked to the main cursor 5, which effective length indicates the true speed of the aircraft through the air.

Now the ground bar is placed upon the map so that the edge thereof extends between the points A and B and the graduated dial 1 is set so that the meridian lines thereon are parallel to the meridian lines on the map.

From a meteorological station the navigator has been informed of wind direction and speed. Say that the wind speed is 30 knots. The wind cursor is displaced along the wind bar until the wind speed index points toward 30 upon the scale thereof. Then the wind bar is turned so that the wind direction index is set against the wind direction which has been given by the station, say 240. When the wind bar is so set the air bar is automatically swung sidewards and simultaneously the main cursor is displaced in the axial direction of the ground bar.

The first result aimed at now has been found, viz. the compass course to be followed in order that the aircraft shall move above the ground in the direction of the ground bar, that is in the direction from A to B. This course is found by reading the graduated dial at the place where the ground course index points against said dial and add to the value so read the value of the degree scale 22 provided at one end of the main cursor, the last mentioned scale being read against the side edge of the air bar 4. The algebraic sum of these two values is the compass course to be followed.

As will be seen the first result aimed at has been found entirely by physical manipulation of the apparatus, no calculation of intermediate values having been necessary.

After having determined the compass course it will be of interest to establish the duration of the flight from A to B, and also to find at any moment the location of the aircraft in relation to the ground, that is the location on the map. This is made by means of the stretchable time scale 17.

Upon said stretchable time scale 17 there is provided, in relation to the map scale for which the apparatus is constructed, a time index 11, which is so located that the time units of the time scale 17 will serve as distance units upon the map when the scale 17 is stretched so that the time index 11 is set against the speed index 8 of the main cursor 5. Therefore the ring 18 is pulled until the time scale has become stretched so that the index 11 is set against the speed index 8, and the stretchable scale is then locked in this position. Knowing the start time for the flight and placing the apparatus upon the map between the points A and B the figures of the time scale will, in relation to the chronometer, exactly denote the location of the aircraft at any moment, and also the flight time between A and B.

For practical reasons the main cursor 5 may be so arranged, that after loosening of the screw 15 it will be possible to raise that end of the cursor 5 which is provided with the scale 22, so that the main cursor may be turned for 180° and thereafter locked in the position shown on Figure 2. This has the practical advantage, that an apparatus constructed for a certain map scale may be used within a larger area of speeds for aircrafts of different types, than would otherwise be the case, since, if the air bar 4 is secured to the screw 15 very near to the outer end of the air bar it would not be possible, with the main cursor in the position shown in Figure 1, to read the drift angle upon the scale 22, whereas this will be possible with the main cursor in the position shown on Figure 2.

I claim:

1. A wind triangle computer comprising a ground bar, a wind bar and an air bar, said ground bar and said wind bar being pivotally connected, a wind cursor on said wind bar, said air bar having one end thereof pivotally connected to said wind cursor, a main cursor on said ground bar, said air bar having its other end pivotally and slidably connected to said main cursor, a graduated dial mounted on the pivot axis of said ground bar and wind bar for determination of the angle between the ground bar and the wind bar and for orientation of the apparatus upon a map, said ground bar having a longitudinal slot therein, and an extensible airspeed scale on said ground bar convertible from an indicated airspeed scale to a true airspeed scale by adjusting said scale for temperature and altitude, said extensible airspeed scale contained in said longitudinal slot in said ground bar with its zero end attached to said bar adjacent the pivotal connection of said ground bar and said wind bar.

2. A wind triangle computor as claimed in claim 1 in which said extensible airspeed scale has thereon a temperature scale, and said ground bar has thereon an altitude scale, said temperature scale and altitude scale positioned such that by extending said airspeed scale to position a given temperature opposite a given altitude the true airspeed at such altitude and temperature will be indicated on said airspeed scale.

3. A wind triangle computor as claimed in claim 2 in which said extensible airspeed scale is made of elastic material.

4. A wind triangle computor comprising a ground bar having a groundspeed scale thereon, a wind bar having a windspeed scale thereon, and an air bar, said ground bar and said wind bar being pivotally connected at the zero ends of said scales, a wind cursor having a wind index thereon slidable on said wind bar, a main cursor having an index thereon slidable on said ground bar, said air bar having one end pivotally connected to said wind cursor and having its other end pivotally and slidably connected to said main cursor, a dial having graduations for 360° rotatably mounted on the pivot axis of said ground bar and wind bar, and an extensible airspeed scale on said ground bar comprising an elastic scale contained in a longitudinal slot in said ground bar and having thereon a temperature scale, said ground bar having an altitude scale thereon, said extensible airspeed scale indicating true airspeed scale when a given temperature is positioned opposite a given altitude on said temperature and altitude scales.

5. A wind triangle computor as claimed in claim 4 in which said extensible airspeed scale has on the reverse side thereof a time-distance scale.

References Cited in the file of this patent
UNITED STATES PATENTS

| | | |
|---|---|---|
| 1,888,206 | Allen | Nov. 22, 1932 |
| 1,910,093 | Colvin | May 23, 1933 |
| 2,244,125 | Siefker | June 3, 1941 |
| 2,256,116 | Hughes | Sept. 16, 1941 |
| 2,296,692 | Thurston | Sept. 22, 1942 |
| 2,339,222 | Hokanson | Jan. 11, 1944 |
| 2,433,249 | Van Sciever | Dec. 23, 1947 |
| 2,449,342 | Tardif | Sept. 14, 1948 |

FOREIGN PATENTS

| | | |
|---|---|---|
| 600,877 | Great Britain | Apr. 21, 1948 |

OTHER REFERENCES

"Instruction Sheet for the Triangulator Scale Flex Rule," published by Arno G. Siefker, 4015 Ruckle Street, Indianapolis, Ind. Received in the Patent Office on December 6, 1941.